UNITED STATES PATENT OFFICE.

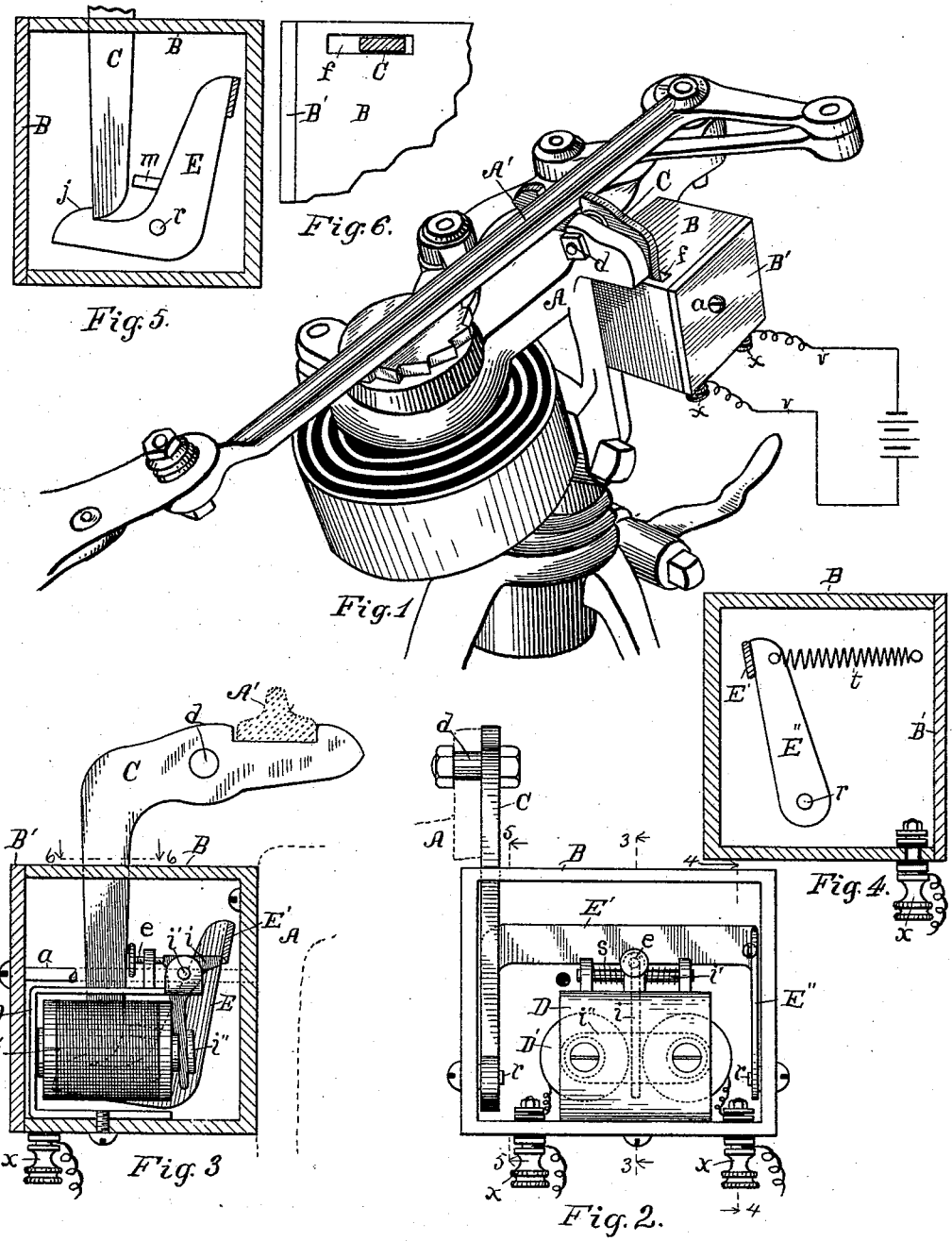

BENJAMIN O. BUSH, OF KALAMAZOO, MICHIGAN.

RELEASE FOR TARGET-TRAPS.

SPECIFICATION forming part of Letters Patent No. 531,260, dated December 18, 1894.

Application filed March 23, 1894. Serial No. 504,812. (No model.)

*To all whom it may concern:*

Be it known that I, BENJAMIN O. BUSH, a citizen of the United States, residing at the city of Kalamazoo, in the county of Kalamazoo and State of Michigan, have invented certain new and useful Improvements in Release Mechanism for Target-Traps, of which the following is a specification.

My invention relates to target traps for throwing flying targets, and relates particularly to the mechanism for releasing the throwing arm of said target traps by means of electric apparatus.

The objects of my invention are, first, to provide such a releasing mechanism that shall be compact so that it will not add materially to the bulk of said target traps; second, to provide an improved means whereby a very light electric current will effect the releasing of the trap; third, to provide, in such a release, suitable means whereby swinging the trap arm into place will cause it to lock there automatically until the release is operated; fourth, to provide, in such a released mechanism, means whereby when the electric current passes, the release will impart an accelerating motion to the locking lever that will insure instantaneous release of the trap arm; fifth, to provide a lock and release mechanism for target traps that can be readily adapted to attach to any trap now in common use. Only the holding catch or locking lever appears outside of the casing. I accomplish these objects by the mechanism shown in the accompanying drawings, in which—

Figure 1 shows a view in perspective of the main parts of the target trap, with my improved release and locking mechanism in position. Fig. 2 is a front elevation of the same with the cover, B', of the case, B, removed. Fig. 3 is a sectional view on line 3—3 of Fig. 2. Fig. 4 is a sectional view on line 4—4 of Fig. 2. Fig. 5 is a sectional view on line 5—5 of Fig. 2. Fig. 6 is a detail sectional view on line 6—6 of Fig. 3, showing the top of the case with the lever, C, in section. The sectional views are all taken looking in the direction of the little arrows at the ends of the section lines.

Similar letters of reference refer to similar parts throughout the several views.

In the drawings, A represents the main frame of the trap proper.

A' is the trap arm which is actuated by a spring to throw the targets held in any suitable holder at the end of the arm. Only a small portion of the target holder is shown in the drawings, as it is not material to my invention. Other details of the trap are not material to my invention.

To the frame, A, of the trap is attached the case, B, by any suitable means. Through a slot in the top of the case, the bent locking lever, C, projects and is pivoted at $d$ on the trap frame, A. In the upper end of the lever, C, is a square notch to receive the trap arm, A'. The mechanism in the case is designed to control this lever, C, so that when the electric current passes, the end of the lever, C, containing the notch will be depressed by the force of the trap arm, A', so that the said arm, A', shall be released so that it will swing around and throw the target by the force of the spring in the trap. In the case, B, and secured to the bottom of it, on a small frame, D, are two induction coils, D', to form an electro magnet.

The lever, C, above mentioned projects down through the slot, $f$, in the case, B, and is engaged by the notch, $j$, on the bent lever, E. The bent lever, E, is pivoted at $r$, inside of the case, B, and on the opposite side of the case, B, a bent lever, E'', is pivoted at $r'$ in a corresponding position. Across the top, connecting the top ends of the lever, E, and lever, E'', extends a bar, E'. A coiled spring, $t$, is attached by one end to the top of the lever, E'', and at its opposite end toward the front of the case so that it always tends to throw the lever, E', forward. The levers, E and E'' and cross-piece E', can be made all in one piece bent to that particular form, and by having the pivots, $r$ and $r'$, in line, the two levers will work together freely without binding. On the lever, E, the pin, $m$, a little above its pivot, $r$, projects forward. This pin, $m$, reaching forward comes in contact with the lower end of the locking lever, C, when the trap is being set and will be pressed by said locking lever to throw the lever, E, into position to engage it. The induction coils, D', with their electro magnets inside, are situated between the levers, E and E''. The armature, $i''$, hangs down in front of the magnets. The armature is supported on the little rock shaft, $i'$, which passes through suitable ears on the frame, D, above. Projecting outward from this little rock shaft, $i'$, is an arm, $i$, which forms a stop to engage the cross-piece, E', as will be clearly seen in Fig. 3. A small coiled spring, $s$, on the rock shaft, $i'$, always tends to hold the armature, $i''$, away from the magnets and keep the stop, $i$, in position to engage with the cross-piece, E'. A small thumb screw, $e$, on the frame, D, is used for adjusting the armature to the proper position.

Having thus pointed out and named the various parts of my invention, the co-action of the various parts is as follows:—When the trap is set, all that is done is to swing the arm, A', around to position, when it locks automatically. This is done by the trap arm, A', striking the lever or a stop on the lever, C, above the pivot, $d$, which swings it back. When the lower end of the lever, C, swings back, it strikes the pin, $m$, on the lever, E, in the case, B, and drives it back, when the end of the lever (which is rounded to pass readily) engages the notch, $j$, as soon as the pressure is reversed. When the lever, E, is depressed, it, by the connecting bar, E', also depresses the bar, E'', which puts tension on the spring, $t$. This also moves the bar, E'', back toward the rear of the case, B. As soon as it is moved back to that point, the spring, $s$, actuates the rock shaft, $i'$, and throws the arm, $i$, which serves as a stop, so that it rises into the path of the cross-piece, E'. This, of course, retains the levers, E and E'', in their depressed position securely so that the notch, $j$, on the lever, E, engages the lower end of the lever, C, securely and this holds the upper end of the lever, C, up against the trap arm, A', causing the notch to engage said trap arm and hold it securely in that position. With all of the parts in position here indicated, the trap is set. When an electric current, generated by a suitable generator, passes through the wires, $v, v$, and the binding posts, $x, x$, through the coil, D', it will magnetize the cores of the coils, which will draw the armature, $i''$, which will depress the catch, $i$, something after the operation of a trigger and lock to an ordinary gun. As soon as the catch is depressed, there is nothing to retain the bar, E', and the spring, $t$, actuates the bar and the two levers, E and E'', throwing them over forward quickly, striking the pin, $m$, against the bottom of the lever, C, throwing the catch $j$, down out of the way, and coincidently imparting an impulse to the lever, C, when the lower end of the lever, C, will move out and the upper end will descend and release the arm, A', which allows the trap to operate. The pressure of the arm, A', depresses the locking lever, C, as soon as it is released. When a new target is placed in the holder and the arm, A', pulled back, it is ready for another throw. The current, of course, passes only when it is desired to release the trap, and when the current is shut off, the small spring, $s$, on the rock shaft, $i$, again throws the armature out so that the mechanism is ready for operation again.

My improved release for a trap can be considerably varied in its details without departing from my invention. I prefer it in the form here shown as it is compact and easy of operation, and locks automatically.

Having thus described my invention, what I claim as new, and desire to secure by Letters Patent, is—

1. In a release mechanism for a trap, the combination of the trap arm A'; the locking lever, C, pivoted at $d$ to the trap frame, A, with a notch to engage said trap arm; a lever, E, pivoted at $r$, in the case, B, having a notch, $j$, to engage the lower end of the locking lever, C; a pin, $m$, on the lever, E, to be pressed by said lever, C; a lever, E'', pivoted at $r'$; a cross-piece, E', connecting said levers, E and E''; a spring, $t$, attached to lever, E'', to pull it forward; a rock shaft, $i'$, with a catch, $i$, to engage the cross-piece, E'; a spring, $s$, to throw said catch, $i$, in position to engage the bar, E'; an armature, $i''$, attached to arms on said rock shaft, $i'$; an electro magnet to depress said armature, and suitable means of exciting the magnet, substantially as described for the purpose specified.

2. In a release mechanism for a target trap, the combination of a trap arm, A'; the locking lever, C, pivoted at $d$, with a catch to engage said trap arm; a lever, E, pivoted at $r$ with a catch, $j$, to engage the lower end of said locking lever, C; a pin, $m$, on said lever, E to come in contact with the lever, C; and suitable means of actuating the lever, E, to depress the catch, $j$, to release the lever, C and start it, for the purpose specified.

3. In a target trap, the combination with the trap arm, of a bent locking lever pivoted near the arm; of a bent lever pivoted at its angle and below the said lever; a notch on the horizontal portion of said bent lever to engage the locking lever, a stop on said locking lever to strike the detaining lever to throw it in position; and means of holding the said detaining lever in position until it is required to release the trap, for the purpose specified.

4. In a target trap, the combination with the trap arm, of a locking lever, C, pivoted at $d$ below said trap arm; a suitable catch to engage the trap arm; a lever, E, pivoted below at $r$, having a notch, $j$, to engage said locking lever; the said locking lever being adapted to strike said lever, E, above its pivot and throw the catch, $j$, up to engage it; a spring adapted to throw said lever, E, forward to release the locking lever, and suitable means of detaining said lever, E, until it is required to release the trap arm.

5. In a release mechanism for a target trap, the combination of a trap arm, A'; with the locking lever, C, pivoted below said trap arm;

a detaining lever, E, pivoted at r, to engage the lower end of said locking lever, C, by the notch, j, said locking lever striking the detaining lever, E, above its pivot to throw it in position to engage said locking lever; a catch to engage said detaining lever, E; and an electro magnet to depress said catch to allow the detaining lever to swing forward and release the locking lever to release the trap arm, for the purpose specified.

In witness whereof I have hereunto set my hand and seal in the presence of two witnesses.

BEN. O. BUSH. [L. S.]

Witnesses:
A. D. HARRIS,
JOHN S. SLEEPER.